United States Patent
Kim et al.

(10) Patent No.: US 9,196,890 B2
(45) Date of Patent: Nov. 24, 2015

(54) BATTERY MODULE WITH WELDED PORTION BETWEEN TERMINALS

(75) Inventors: Sung-Bae Kim, Yongin-si (KR); Yong-Sam Kim, Yongin-si (KR); Sang-Won Byun, Yongin-si (KR); Hyo-Seob Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 431 days.

(21) Appl. No.: 12/871,812

(22) Filed: Aug. 30, 2010

(65) Prior Publication Data

US 2011/0081568 A1    Apr. 7, 2011

Related U.S. Application Data

(60) Provisional application No. 61/248,806, filed on Oct. 5, 2009.

(51) Int. Cl.
  *H01M 2/20* (2006.01)
  *H01M 2/30* (2006.01)

(52) U.S. Cl.
  CPC *H01M 2/30* (2013.01); *H01M 2/20* (2013.01); *H01M 2/204* (2013.01); *H01M 2/206* (2013.01); *Y10T 29/49968* (2015.01)

(58) Field of Classification Search
  CPC .......... H01M 2/20; H01M 2/204; H01M 2/30
  USPC ................... 429/149, 158, 160; 439/284, 875
  See application file for complete search history.

(56) References Cited

U.S. PATENT DOCUMENTS

| 6,146,788 | A | 11/2000 | Ikeda et al. |
| 8,574,008 | B2 | 11/2013 | Große et al. |
| 2001/0049054 | A1 | 12/2001 | Enomoto et al. |
| 2006/0088761 | A1 | 4/2006 | Ota et al. |
| 2006/0127754 | A1 | 6/2006 | Hamada et al. |
| 2006/0255764 | A1 | 11/2006 | Cho |
| 2008/0063929 | A1* | 3/2008 | Byun et al. ............. 429/121 |
| 2009/0068555 | A1 | 3/2009 | Fukuoka et al. |

(Continued)

FOREIGN PATENT DOCUMENTS

| CN | 101145605 A | 3/2008 |
| CN | 101218697 A | 7/2008 |

(Continued)

OTHER PUBLICATIONS

KIPO Notice of Allowance dated Apr. 23, 2012, for corresponding Korean Patent application 10-2010-0087996, (5 pages).

(Continued)

*Primary Examiner* — Zachary Best
(74) *Attorney, Agent, or Firm* — Christie, Parker & Hale, LLP

(57) ABSTRACT

A battery module including a plurality of rechargeable batteries, and a connector for connecting a first terminal of one of the plurality of rechargeable batteries and including a first material to a second terminal of another one of the plurality of rechargeable batteries and including a second material, wherein the connector includes: a first portion connected to the first terminal and including the first material; and a second portion connected to the second terminal and including the second material, and a welded portion connecting the first portion and the second portion.

18 Claims, 4 Drawing Sheets

(56) References Cited

U.S. PATENT DOCUMENTS

| | | | |
|---|---|---|---|
| 2009/0123830 A1* | 5/2009 | Kato et al. | 429/160 |
| 2009/0159311 A1* | 6/2009 | Zheng et al. | 174/126.3 |
| 2009/0223940 A1 | 9/2009 | Hosoya | |
| 2010/0104939 A1 | 4/2010 | Wang et al. | |
| 2011/0081569 A1 | 4/2011 | Kim et al. | |

FOREIGN PATENT DOCUMENTS

| | | | | |
|---|---|---|---|---|
| DE | 20 2009 012 647 U1 | 12/2009 | | |
| DE | 10 2010 015 810.0 | 4/2010 | | |
| DE | 10 2009 024 513 A1 | 12/2010 | | |
| EP | 1 160 893 A2 | 12/2001 | | |
| GB | 2 330 251 A | 4/1999 | | |
| JP | 11-120988 | 4/1999 | | |
| JP | 2002358945 A * | 12/2002 | | H01M 2/20 |
| JP | 2003-077442 | 3/2003 | | |
| JP | 2006-196449 | 7/2006 | | |
| JP | 2008-123800 | 5/2008 | | |
| JP | 2008123800 A * | 5/2008 | | H01M 2/20 |
| JP | 4326214 B2 | 6/2009 | | |
| JP | 2010-521046 | 6/2010 | | |
| JP | 2011-082159 | 4/2011 | | |
| KR | 10-2008-0003778 | 1/2008 | | |
| KR | 2009062794 A * | 6/2009 | | |
| KR | 10-0946834 | 3/2010 | | |
| WO | WO 93/10935 A1 | 6/1993 | | |
| WO | WO 2008/144994 A1 | 12/2008 | | |
| WO | WO 2010/142679 A1 | 12/2010 | | |

OTHER PUBLICATIONS

Patent Abstracts of Japan, and English machine translation of Japanese Publication 2003-077442 listed above, (17 pages).

Korean Patent Abstracts for Korean Publication 1020090062794, dated Jun. 17, 2009, corresponding to Korean Patent 10-0946834 listed above.

European Search Report dated Dec. 6, 2010, for corresponding European Patent application 10175576.7, noting listed references in this IDS.

JPO Office action dated Apr. 2, 2013, for corresponding Japanese Patent application 2010-225773, (1 page).

Patent Abstracts of Japan, and English machine translation of Japanese Publication 2006-196449, dated Jul. 27, 2006, listed above, (18 pages).

SIPO Office action dated Aug. 12, 2013, with English translation, for Chinese Patent application 201010291578.9, (7 pages).

SIPO Office action dated Feb. 20, 2013, for corresponding Chinese Patent application 201010291578.9, with English translation, (18 pages).

EPO Summons to Attend Oral Hearings, dated Feb. 16, 2015, for corresponding European Patent application 10175576.7, (16 pages).

Wikipedia page "Friction sir welding" edited on Jul. 24, 2009, (15 pages).

English machine translation of Japanese Publication 2004-202536 dated Jul. 22, 2004, corresponding to Japanese Patent 4326214 B2, issued Jun. 19, 2009, listed above, (13 pages).

* cited by examiner

BATTERY MODULE WITH WELDED PORTION BETWEEN TERMINALS

CROSS-REFERENCE TO RELATED APPLICATIONS

This application claims the benefit of U.S. Provisional Application No. 61/248,806, filed on Oct. 5, 2009, in the United States Patent and Trademark Office, the disclosure of which is incorporated herein in its entirety by reference.

BACKGROUND

1. Field

The following description relates to a battery module with electrically connected rechargeable batteries.

2. Description of Related Art

Rechargeable batteries can be charged and discharged. Small capacity rechargeable batteries are used for small portable electronic devices such as mobile phones, laptop computers, and camcorders, while large capacity batteries are used as power sources for driving motors of hybrid vehicles, etc.

High power battery modules using a high energy density non-aqueous electrolyte have been developed, and the high power battery modules are formed as large-capacity battery modules by connecting a plurality of rechargeable batteries in series to be used for driving the motors of electric vehicles, etc.

Further, one large capacity rechargeable battery is generally composed of a plurality of rechargeable batteries connected in series, in which the rechargeable battery may be formed in a cylindrical shape or a prismatic shape.

Prismatic rechargeable batteries include a case having an electrode assembly in which a positive electrode and a negative electrode are disposed with a separator therebetween, and a space where the electrode assembly is disposed, a cap plate sealing the case and having a terminal hole where an electrode terminal is inserted, and an electrode terminal that is electrically connected with the electrode assembly and protrudes outside the case through the terminal hole.

The electrode terminal is fixed to the cap plate by a nut, but the nut can be loosened by continuous external vibration or shock. This causes contact resistance inside the rechargeable batteries, such that the output and cycle-life of the rechargeable batteries are reduced.

In particular, when a positive electrode terminal is made of aluminum and a negative electrode terminal is made of copper, since a connecting member and at least one of the positive electrode terminal or the negative electrode terminal are made of different materials, corrosion may occur or contact resistance may be continuously increased by contact between the different metals.

A method of connecting a connecting member to the positive electrode and the negative electrode using resistance welding has been proposed.

However, when the connecting member is made of a different material from that of at least one of the positive electrode terminal or the negative electrode terminal, it is difficult to bond the connecting member and the terminals with different materials using resistance welding or ultrasonic welding because of the different melting points.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a battery module for easily and stably connecting a connecting member with terminals.

A battery module according to an exemplary embodiment of the present invention includes: a plurality of rechargeable batteries, and a connector for connecting a first terminal of one of the plurality of rechargeable batteries and including a first material to a second terminal of another one of the plurality of rechargeable batteries and including a second material, wherein the connector includes: a first portion connected to the first terminal and including the first material; and a second portion connected to the second terminal and including the second material, and a welded portion connecting the first portion and the second portion.

The welded portions may be formed by friction stir welding.

The welded portion may include a spot weld.

The first material may include aluminum. The second material may include copper. The first material and the second material may be different.

The first portion may include a first connecting bar and a first protrusion extending from the first connecting bar. The second portion may include a second connecting bar and a second protrusion extending from the second connecting bar, wherein the first protrusion and the second protrusion are configured to overlap with one another to form an overlapping region, and wherein the overlapping region includes the welded portion. The first protrusion may be thinner than the first connecting bar and the second protrusion may be thinner than the second connecting bar, wherein the first connecting bar, the second connecting bar, and the overlapping region may have substantially a same thickness. The first portion and the second portion may be plate shaped, wherein the first protrusion is a bended portion formed in a plane parallel to a plane of the first connecting bar, wherein the bended portion overlaps with part of the second portion to form an overlapping region, and wherein the overlapping region includes the welded portion. The first connecting bar and the second connecting bar may be coplanar, wherein the connector is thicker at the overlapping region than at the first connecting bar or at the second portion.

The first portion and the second portion may be plate shaped and are arranged to be coplanar, wherein a side of the first portion and a side of the second portion may be in contact with one another. The welded portion may be formed in a line where the side of the first portion and the side of the second portion are in contact.

The first terminal and the second terminal may be plate shaped, wherein the first portion is welded to the first terminal and the second portion is welded to the second terminal.

The first terminal and the second terminal may be cylindrical and include threaded exterior surfaces, wherein the first portion and the second portion of the connector each has a terminal hole for respectively accommodating the first terminal and the second terminal, and wherein locking nuts connect the connector to the first terminal and the second terminal, respectively.

The welded portion may include a nugget zone including a mixture of the first material and the second material. The first portion and the second portion of the connector may be in contact, and wherein the nugget zone traverses the contacting surfaces of the first portion and the second portion. The nugget zone may be formed by melding of the first portion with the second portion while in a solid state to form a melded material, and a dynamic recrystallization of the melded material. The welded portion may further include a thermo-mechanically affected zone around the nugget zone and formed by plastic deformation and partial recrystallization of the first material with the second material, and a heat affected zone around the thermo-mechanically affected zone and having slanting crystals and air holes.

The welded portion may include a welding groove recessed from a surface of the connector.

According to another exemplary embodiment of the present invention, a method of connecting a first terminal of a first rechargeable battery with a second terminal of a second rechargeable battery, includes: providing a first connector portion including a same material as the first terminal; providing a second connector portion including a same material as the second terminal; and forming a welded portion to connect the first connector portion with the second connector portion by utilizing friction stir welding; and connecting the first connector portion to the first terminal and the second connector portion to the second terminal.

The friction stir welding may form a nugget zone including a mixture of the first material and the second material by melding of the first connector portion with the second connector portion while in a solid state to form a melded material, and dynamic recrystallization of the melded material.

According to exemplary embodiments of the present invention, with a decrease in contact resistance and corrosion, the output of the battery module can be improved, and the cycle-life of the battery module can also be improved.

Figure 1:
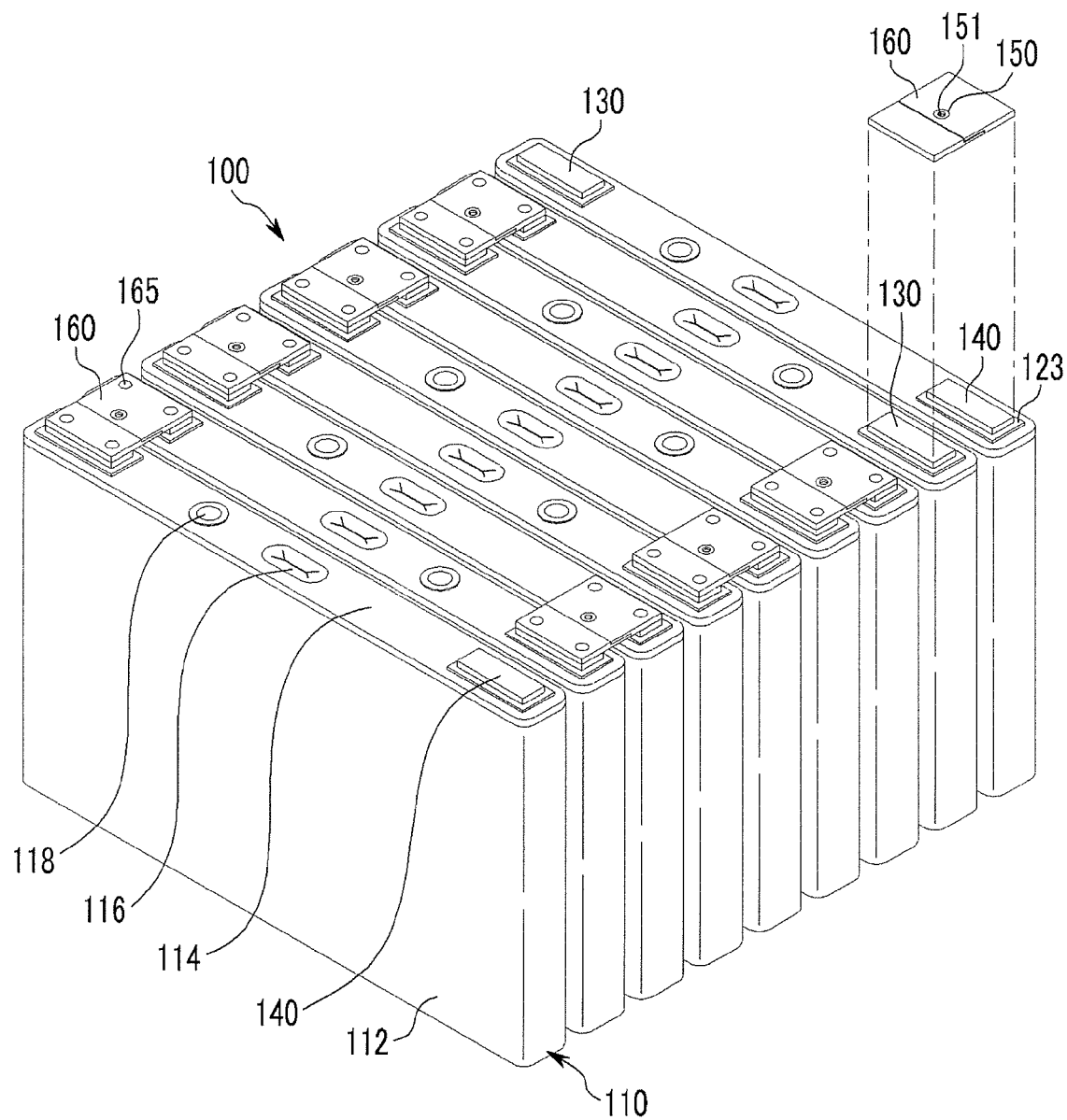
FIG. 1 is a perspective view showing a battery module according to a first exemplary embodiment of the present invention.

DESCRIPTION OF REFERENCE NUMERALS
INDICATING FEATURES IN THE DRAWINGS

| 100, 300: battery module | 110, 310: rechargeable battery |
|---|---|
| 112, 312: case | 114, 314: cap plate |
| 130, 330: positive electrode terminal | 140, 340: negative electrode terminal |
| 150, 215, 236: welded portion | 151, 216, 235: welding groove |
| 152: nugget zone | 154: thermo-mechanically affected zone |
| 156: heat affected zone | 160, 210, 230, 350: connecting member |
| 161, 211, 231, 351: first connecting bar | 211a: body portion |
| 212a: bended portion | 161a: first welding protrusion |
| 162, 212, 232, 352: second connecting bar | 323: lower nut |
| 162a: second welding protrusion | 351a, 352a: terminal hole |
| 165: terminal welded portion | |
| 324: upper nut | |

DETAILED DESCRIPTION

In the following detailed description, only certain exemplary embodiments of the present invention have been shown and described by way of illustration. As those skilled in the art will recognize, the described embodiments may be modified in various different ways without departing from the spirit or scope of the present invention. Accordingly, the drawings and description are to be regarded as illustrative in nature and not restrictive. Like reference numerals designate like elements throughout the specification.

Figure 2:
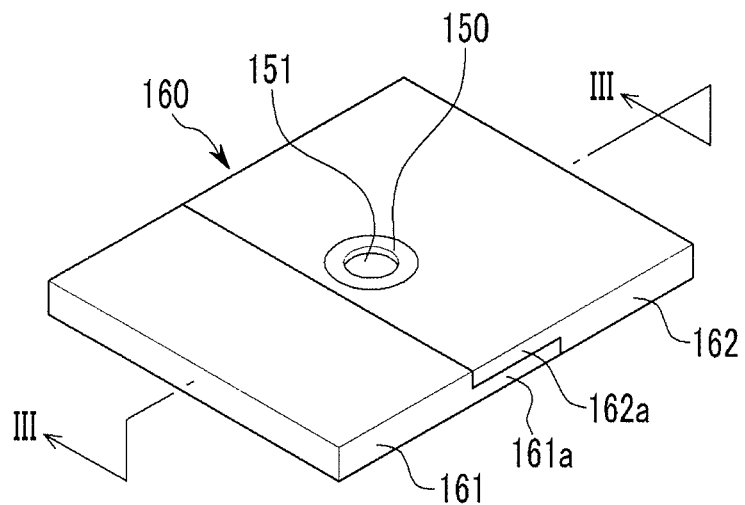
FIG. 2 is a perspective view of a connecting member according to the first exemplary embodiment of the present invention.

FIG. 1 is a perspective view showing a battery module according to a first exemplary embodiment of the present invention, and FIG. 2 is a perspective view showing a connecting member according to the first exemplary embodiment of the present invention.

Referring to FIG. 1 and FIG. 2, a battery module 100 according to the first exemplary embodiment includes a plurality of rechargeable batteries 110 each having a positive electrode terminal 130 and a negative electrode terminal 140, and connecting members 160 that electrically connect the rechargeable batteries 110.

The battery module 100 according to the first exemplary embodiment is formed by connecting the rechargeable batteries 110 in series. However, the present invention is not limited thereto, and in some embodiments the rechargeable batteries 110 may be connected, for example, in parallel.

The rechargeable battery 110 according to the first exemplary embodiment is formed in a prismatic shape and includes a case 112, a cap plate 114 connected to an opening of the case 112, and the positive electrode terminal 130 and the negative electrode terminal 140 that protrude outside the case 112. Although the rechargeable battery is exemplified in the first exemplary embodiment in a prismatic shape, the present invention is not limited thereto, and the battery may be formed, for example, in a cylindrical shape or other shapes.

A vent member 116 that is opened when an internal pressure increases and a sealing cap 118 for sealing an electrolyte injection inlet are located on the cap plate 114.

The terminals 130 and 140 are fixed to the cap plate 114 while protruding outside the cap plate 114, and a gasket 123 is positioned between the cap plate 114 and each of the terminals 130 and 140 for insulation and sealing. In this embodiment, the positive electrode terminal 130 and the negative electrode terminal 140 are formed substantially in a plate shape and are electrically connected to an electrode assembly (not shown) inserted in the case 112. The positive electrode terminal 130 may be made of aluminum and the negative electrode terminal 140 may be made of copper.

The rechargeable batteries 110 are arranged to be adjacent to each other and are connected in series by the connecting members 160, in which the positive electrode terminals 130 and the negative electrode terminals 140 of adjacent rechargeable batteries 110 are alternately arranged, and the connecting member 160 is welded to the positive electrode terminal 130 of one rechargeable battery 110 and the negative electrode terminal of an adjacent rechargeable battery 110.

The connecting member 160 is plate shaped and covers the positive electrode terminal 130 and the negative electrode terminal 140. The connecting member 160 is welded to the terminals 130 and 140, respectively, and a terminal welded portion 165 is formed on the connecting member 160.

The connecting member 160 includes a first connecting bar 161 and a second connecting bar 162 that is bonded to the first connecting bar 161 by friction stir welding. The first connecting bar 161 may be made of aluminum, as may be the positive electrode terminal 130, and the second connecting bar 162 may be made of copper, as may be the negative electrode terminal 140. The first connecting bar 161 is fixed to the positive electrode terminal 130, for example, by welding and the second connecting bar 162 is fixed to the negative electrode terminal 140, for example, by welding.

A first welding protrusion 161a is formed at a side of the first connecting bar 161. The first welding protrusion 161a may extend from a lower side of the first connecting bar 161 and may have a smaller thickness than other portions of the first connecting bar 161, and is stepped with respect to an upper surface of the first connecting bar 161.

A second welding protrusion 162a is formed at a side of the second connecting bar 162. The second welding protrusion 162a may extend from a lower side of the second connecting bar 162 and may have a smaller thickness than other portions of the second connecting bar 162, and is stepped with respect to an upper surface of the second connecting bar 162.

The second welding protrusion 162a is positioned over the first welding protrusion 161a, such that the second welding protrusion 162a overlaps with the first welding protrusion 161a. In this position, the first welding protrusion 161a and the second welding protrusion 162a are bonded by friction stir welding.

Figure 3:
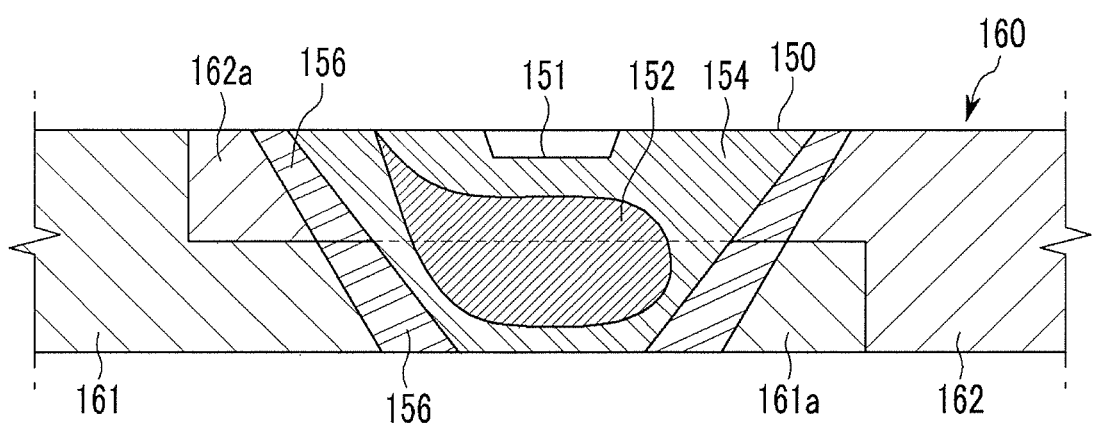
FIG. 3 is a partial cross-sectional view of the connecting member according to the first exemplary embodiment of the present invention.

FIG. 3 is a partial cross-sectional view of a connecting portion according to the first exemplary embodiment of the present invention.

Referring to FIG. 3, with the welding protrusions 161a and 162a overlapping, a welded portion 150 is formed by rotating a tool to recrystallize the structure using dynamic flow. The tool has a pin and a shank where the pin is fixed, and the cross-section where the pin protrudes from the shank is called a shoulder.

The first connecting bar 161 and the second connecting bar 162 may be bonded by spot welding, in which the portion where the shoulder contacts the connecting member 160 is the welded portion 150, and a welding groove 151 is located around a portion of the welded portion 150 where the pin was positioned.

As shown in FIG. 3, a nugget zone 152 that is formed by dynamic recrystallization, a thermo-mechanically affected zone (TMAZ) 154, and a heat affected zone (HAZ) 156 are formed in the welded portion 150.

The nugget zone 152 is a portion where recovery and recrystallization occur due to high heat and the amount of deformation, such that the nugget zone 152 may also be called a dynamic-recrystallized portion. Unlike general welding in which melting occurs by heat, the nugget zone 152 is formed by dynamic recrystallization of materials that are melded in a solid state by friction heat and stirring. A diameter of the nugget zone 152 is generally larger than a diameter of the pin and smaller than a diameter of the shoulder 183. The size of the nugget zone 152 varies based on the rotational speed of the tool, such that when the rotational speed is high, the size of the nugget zone 152 is reduced. When the rotational speed is too high, the shape of the crystals may be incomplete, and defects may occur approximate the incomplete portion.

The thermo-mechanically affected zone 154 is a portion where partial recrystallization occurs by plastic deformation caused by friction at a contact surface where the shoulder of the tool contacts the connecting member 160, and where thermal deformation by friction and mechanical deformation caused by the shoulder simultaneously occur. Crystals softened by excessive plastic flow and deformation of the material are distributed at an angle in the thermo-mechanically affected zone 154.

The heat affected zone 156 is more affected by heat than the thermo-mechanically affected zone 154, in which slanting crystals exist and a plurality of air holes may be formed.

When the first connecting bar 161 contacting the positive electrode terminal 130 is made of the same material as the positive electrode terminal 130 and the second connecting bar 162 contacting the negative electrode terminal 140 is made of the same material as the negative electrode terminal 140, as in the present exemplary embodiment, contact resistance may be minimized or reduced, and corrosion between the connecting member 160 and the terminals 130 and 140 may also be minimized or reduced. Accordingly, not only will the output of the battery module 100 be improved, but bonding between the connecting member 160 and the terminals 130 and 140 is also improved, such that the overall cycle-life of the battery module 100 may also be improved.

Further, in the connecting member 160, the portion made of the same material as the positive electrode terminal 130 is welded to the positive electrode terminal 130, and the portion made of the same material as the negative electrode terminal 140 is welded to the negative electrode terminal 140, such that respective weldability between the connecting member 160 and terminals 130 and 140 is improved.

Further, by bonding the first connecting bar 161 and the second connecting bar 162 by friction stir welding, the first connecting bar 161 made of aluminum and the second connecting bar 162 made of copper may be more effectively welded together. Copper and aluminum have different melting points, such that when they are bonded by resistance welding or ultrasonic welding there is a greater possibility that defects may occur at the welded portion 150, or the welded portion may more easily be separated by external shock or vibration. In particular, when a battery module is used in electric vehicles or hybrid electric vehicles, vibration is continuously applied to the connecting member 160, such that the continuous vibration may cause contact defects between the connecting member and the terminals.

However, when the first connecting bar 161 and the second connecting bar 162 are bonded by friction stir welding, as in the present exemplary embodiment, solid-state bonding can be achieved, such that the connecting member 160 and the terminals 130 and 140, which have different melting points, can be stably bonded together. In particular, the nugget zone 152 formed approximate the center of the welded portion 150 is an area where dynamic recrystallization occurs, such that it has a structure that more effectively resists external vibration and shock. Further, the thermo-mechanically affected zone 154, which is an area where two connecting bars 161 and 162 are rotated and bonded, has mixed parent metals, such that it also has structural characteristics that resist external shock and vibration.

Further, the friction stir welding does not need a heat source, a welding rod, or a filler metal, unlike other types of welding, such that friction stir welding is a more environmentally-friendly type of welding that does not discharge harmful light or substances. Further, since dynamic recombination occurs, solidification cracks that may occur in, for example, fuse bonding, may be minimized or reduced and there is less deformation, such that mechanical properties are excellent.

Figure 4:
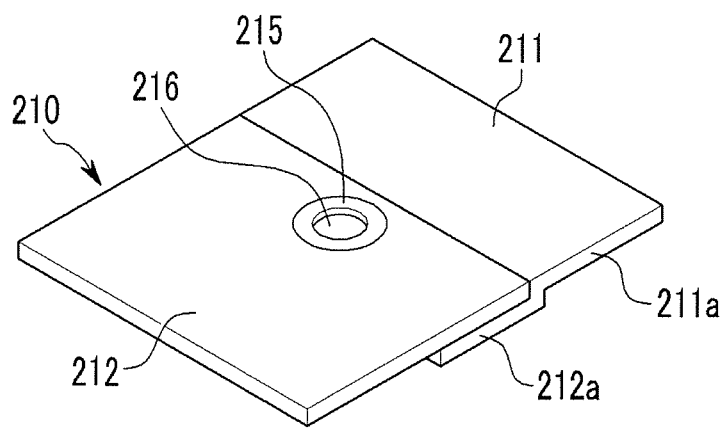
FIG. 4 is a perspective view showing a connecting member according to a second exemplary embodiment of the present invention.

FIG. 4 is a perspective view showing a connecting member according to a second exemplary embodiment of the present invention.

Referring to FIG. 4, a connecting member 210 according to the second exemplary embodiment includes a first connecting bar 211 and a second connecting bar 212 attached to the first connecting bar 211, for example, by welding. The first connecting bar 211 and the second connecting bar 212 are made of different materials, in which the first connecting bar 211 may be made of the same material as the negative electrode terminal 140 and the second connecting bar 212 may be made of the same material as the positive electrode terminal 130.

The second connecting bar 212 is formed substantially in a rectangular plate shape. The first connecting bar 211 has a body portion 211a arranged in substantially a same plane with the second connecting bar 212, and a bended portion 212a bending from the body portion 211a and arranged to be under the second connecting bar 212 in a plane substantially parallel to the body portion 211a.

The bended portion 212a is in close contact with the lower side of the second connecting bar 212 and overlaps the second connecting bar 212. A welded portion 215 is formed by bonding the second connecting bar 212 and the bended portion 212a by friction stir welding using a tool. A welding groove 216 where a pin of the tool was positioned is located around the center of the welded portion 215.

The first connecting bar 211 can easily overlap with the second connecting bar 212 by bending the first connecting bar 211 according to the second exemplary embodiment. Further, since the first connecting bar 211 and the second connecting bar 212 are bonded by friction stir welding, different metals can be more easily and stably bonded together, and the connecting member 210 can also be more easily coupled to the terminals 130 and 140, for example, by more conventional types of welding.

Figure 5:
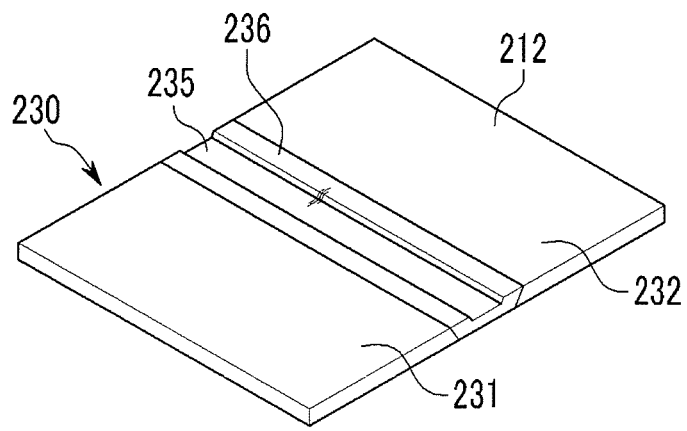
FIG. 5 is a perspective view showing a connecting member according to a third exemplary embodiment of the present invention.

FIG. 5 is a perspective view showing a connecting member according to a third exemplary embodiment of the present invention.

Referring to FIG. 5, a connecting member 230 according to the third exemplary embodiment includes a first connecting bar 231 and a second connecting bar 232 attached to the first connecting bar 231 by, for example, welding. The first connecting bar 231 and the second connecting bar 232 may be made of different materials, in which the first connecting bar 231 may be made of the same material as the positive electrode terminal 130 and the second connecting bar 232 may be made of the same material as the negative electrode terminal 140.

The first connecting bar 231 and the second connecting bar 232 are each formed substantially in a rectangular plate shape and arranged such that a side of the first connecting bar 231 and a side of the second connecting bar 232 contact each other.

In this position, a tool is positioned at an interface between the first connecting bar 231 and the second connecting bar 232, and the first connecting bar 231 and the second connecting bar 232 can be fixed together by welding. The tool performs welding while moving along the interface between the first connecting bar 231 and the second connecting bar 232, such that a welded portion 236 is shaped substantially in a line. A welding groove 235 where the pin was positioned is located around a center of the welded portion 236.

According to the third exemplary embodiment, since a weld line is formed with the first connecting bar 231 and the second connecting bar 232 contacting each other, the welded area is wider such that the first connecting bar 231 and the second connecting bar 232 can be more stably fixed.

Figure 6:
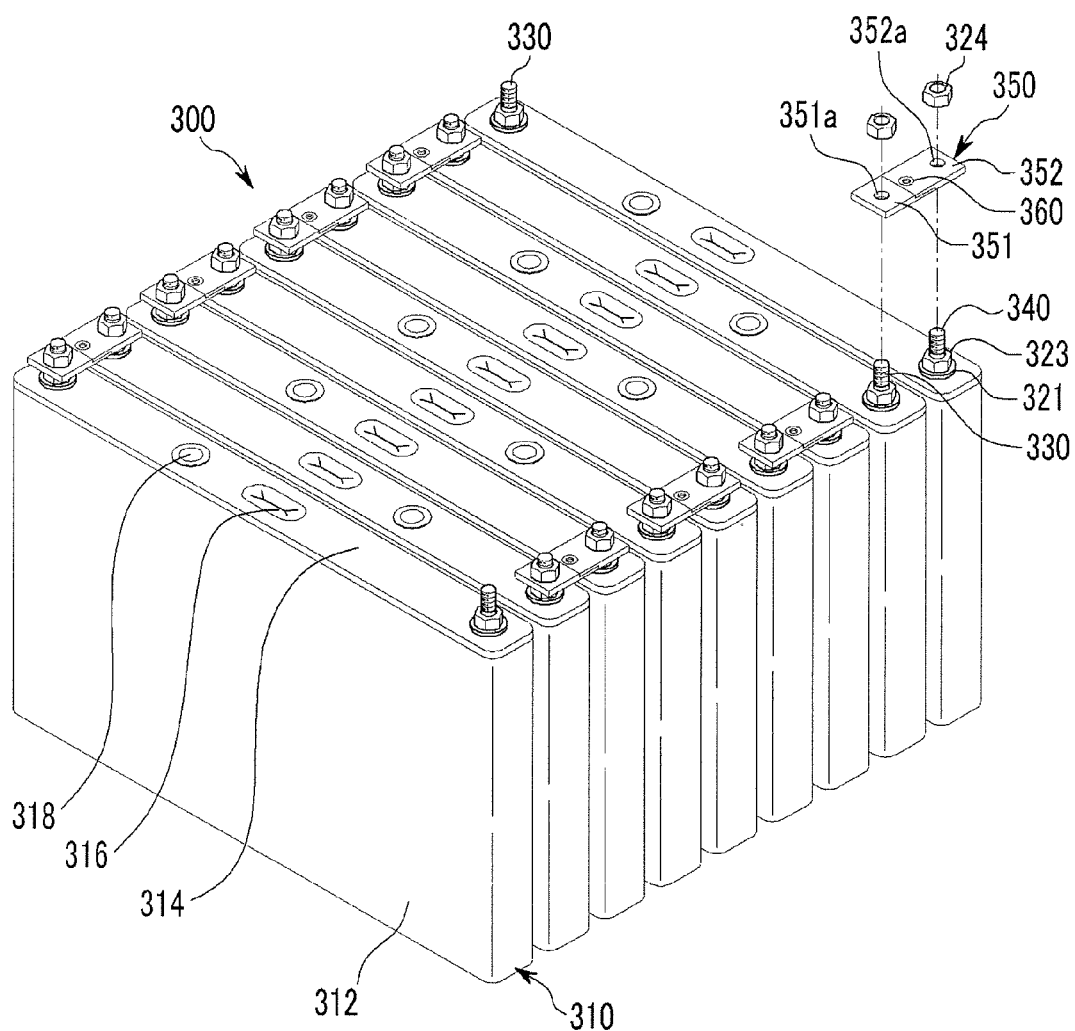
FIG. 6 is a perspective view showing a battery module according to a fourth exemplary embodiment of the present invention.

FIG. 6 is a perspective view showing a battery module according to a fourth exemplary embodiment of the present invention.

Referring to FIG. 6, a battery module 300 according to the fourth exemplary embodiment includes a plurality of rechargeable batteries 310 having a positive electrode terminal 330 and a negative electrode terminal 340, and connecting members 350 that electrically connect the rechargeable batteries 310.

The battery module 300 according to the third exemplary embodiment is formed by connecting the rechargeable batteries 310 in series.

The rechargeable batteries 310 according to the fourth exemplary embodiment are each formed in a prismatic shape and include a case 312, a cap plate 314 connected to an opening of the case 312, and the positive electrode terminal 330 and the negative electrode terminal 340 protruding outside the case 312. A vent member 316 that is opened when an internal pressure increases and a sealing cap 318 for sealing an electrolyte injection inlet are located on the cap plate 314.

Further, the terminals 330 and 340 protrude outside the cap plate 314, and lower nuts 323 for supporting the terminals 330 and 340 on the cap plate 314 are fitted on the terminals 330 and 340. Further, a gasket 321 may be arranged between each lower nut 323 and the cap plate 314 for insulation.

In this embodiment, the positive electrode terminal 330 and the negative electrode terminal 340 are each substantially in a cylindrical shape, and the outer circumferential surfaces may be threaded to fit nuts. Further, the positive electrode terminal 330 and the negative electrode terminal 340 of each battery are electrically connected with an electrode assembly inserted in the case 312 of the battery. The positive electrode terminal 330 may be made of aluminum and the negative electrode terminal 340 may be made of copper.

The connecting member 350 is arranged on the lower nuts 323, and includes a first connecting bar 351 contacting the positive electrode terminal 330 and a second connecting bar 352 contacting the negative electrode terminal 340. The first connecting bar 351 may be made of the same material as the positive electrode terminal 330, and may have a terminal hole 351a in which the positive electrode terminal 330 is inserted. The second connecting bar 352 may be made of the same material as the negative electrode terminal 340, and may have a terminal hole 352a in which the negative electrode terminal 340 is inserted.

The connecting member 350 can be fixed to the terminals 330 and 340 by inserting the positive electrode terminal 330 and the negative electrode terminal 340 in the terminal holes 351a and 352a, respectively, and then respectively fitting upper nuts 324 on the terminals 330 and 340.

In some embodiments, the connecting member 350 is formed in a similar structure as the connecting member 160 according to the first exemplary embodiment. Welding protrusions are formed on the first connecting bar 351 and the second connecting bar 352, and a welded portion 360 is formed on the connecting portion by overlapping and then bonding the welding protrusions using friction stir welding. In other embodiments, the connecting member may have other structures, for example, similar to the connecting members as described above in the second or third embodiments.

According to the fourth exemplary embodiment, if the portion of the connecting member 350 contacting the positive electrode terminal 330 is made of the same material as the positive electrode terminal 330, and the portion of the connecting member 350 contacting the negative electrode terminal 340 is made of the same material as the negative electrode terminal 340, corrosion between the connecting member 350 and the terminals 330 and 340 can be minimized or reduced. Further, since the first connecting bar 351 and the second connecting bar 352 are bonded by friction stir welding, different metals can be more stably fixed together.

While this invention has been described in connection with what is presently considered to be practical exemplary embodiments, it is to be understood that the invention is not limited to the disclosed embodiments, but is instead intended to cover various modifications and equivalent arrangements included within the spirit and scope of the appended claims.

What is claimed is:

1. A battery module comprising a plurality of rechargeable batteries, and a connector for connecting a first terminal of one of the plurality of rechargeable batteries and comprising a first material to a second terminal of another one of the plurality of rechargeable batteries and comprising a second material, wherein the connector comprises:
   a first portion connected to the first terminal and comprising the first material, the first portion comprising a substantially planar first connecting bar extending in a first plane towards the second terminal;
   a second portion connected to the second terminal and comprising the second material, the second portion comprising a substantially planar second connecting bar extending in the first plane towards the first terminal, and
   a friction-stir welded portion connecting the first portion and the second portion,
   wherein the first portion further comprises a first protrusion extending from the first connecting bar,
   wherein the second portion further comprises a second protrusion extending from the second connecting bar, wherein the first protrusion and the second protrusion are configured to overlap with one another to form an overlapping region, and wherein the overlapping region comprises the friction-stir welded portion, and
   wherein the first protrusion is thinner than the first connecting bar and the second protrusion is thinner than the second connecting bar, and wherein the first connecting bar, the second connecting bar, and the overlapping region have substantially a same thickness.

2. The battery module of claim 1, wherein the friction-stir welded portion comprises a spot weld.

3. The battery module of claim 1, wherein the first material comprises aluminum.

4. The battery module of claim 1, wherein the second material comprises Copper.

5. The battery module of claim 1, wherein the first material and the second material are different.

6. The battery module of claim 1, wherein the first portion and the second portion are plate shaped, wherein the first protrusion is a bended portion formed in a plane parallel to a plane of the first connecting bar, wherein the bended portion overlaps with part of the second portion to form an overlapping region, and wherein the overlapping region comprises the friction-stir welded portion.

7. The battery module of claim 6, wherein the first connecting bar and the second portion are coplanar, and wherein the connector is thicker at the overlapping region than at the first connecting bar or at the second portion.

8. The battery module of claim 1, wherein the first portion and the second portion are plate shaped and are arranged to be coplanar, wherein a side of the first portion and a side of the second portion are in contact with one another.

9. The battery module of claim 8, wherein the friction-stir welded portion is formed in a line where the side of the first portion and the side of the second portion are in contact.

10. The battery module of claim 1, wherein the first terminal and the second terminal are plate shaped, and wherein the first portion is welded to the first terminal and the second portion is welded to the second terminal.

11. The battery module of claim 1, wherein the first terminal and the second terminal are cylindrical and comprise threaded exterior surfaces, wherein the first portion and the second portion of the connector each has a terminal hole for respectively accommodating the first terminal and the second terminal, and wherein locking nuts connect the connector to the first terminal and the second terminal, respectively.

12. The battery module of claim 1, wherein the friction-stir welded portion comprises a nugget zone comprising a mixture of the first material and the second material.

13. The battery module of claim 12, wherein the first portion and the second portion of the connector are in contact, and wherein the nugget zone traverses the contacting surfaces of the first portion and the second portion.

14. The battery module of claim 12, wherein the nugget zone is formed by melding of the first portion with the second portion while in a solid state to form a melded material, and a dynamic recrystallization of the melded material.

15. The battery module of claim 14, wherein the friction-stir welded portion further comprises a thermo-mechanically affected zone around the nugget zone and formed by plastic deformation and partial recrystallization of the first material with the second material, and a heat affected zone around the thermo-mechanically affected zone.

16. The battery module of claim 1, wherein the friction-stir welded portion comprises a welding groove recessed from a surface of the connector.

17. A method of connecting a first terminal of a first rechargeable battery with a second terminal of a second rechargeable battery to form the battery module according to claim 1, the method comprising:
   providing the first portion comprising the same material as the first terminal;
   providing the second portion comprising the same material as the second terminal;
   forming the welded portion to connect the first portion with the second portion by utilizing friction stir welding; and
   connecting the first portion to the first terminal and the second portion to the second terminal.

18. The method of claim 17, wherein the friction stir welding forms a nugget zone comprising a mixture of the first material and the second material by melding of the first portion with the second portion while in a solid state to form a melded material, and dynamic recrystallization of the melded material.

* * * * *